(12) United States Patent
DeLeeuw et al.

(10) Patent No.: US 6,237,732 B1
(45) Date of Patent: May 29, 2001

(54) BUSHING BOOT FOR A CAM BRAKING SYSTEM

(75) Inventors: William L. DeLeeuw, Rochester Hills; David K. Pfister, Ortonville, both of MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/334,158

(22) Filed: Jun. 16, 1999

(51) Int. Cl.⁷ ....................................................... F16C 33/10
(52) U.S. Cl. ..................... 188/205 R; 188/329; 188/330; 188/332
(58) Field of Search ................................. 188/72.7, 72.9, 188/205 R, 206 R, 329, 330, 324, 332, 338, 339, 325; 277/636; 74/54, 55, 107, 337.5, 567; 384/207, 397, 130, 138, 275, 222, 145, 147, 152, 276; 403/359, 361, 368, 370

(56) References Cited

U.S. PATENT DOCUMENTS 4,540,072 * 9/1985 Suzuki et al. .
4,890,939 * 1/1990 Koschinat .
5,788,340 * 8/1998 Kobyashi .

FOREIGN PATENT DOCUMENTS

2321677 * 8/1998 (GB) .

* cited by examiner

Primary Examiner—Douglas C. Butler
(74) Attorney, Agent, or Firm—Carlson, Gaskey & Olds

(57) ABSTRACT

A bushing boot for a cam braking system is disclosed that snaps in place over a bushing assembly. The bushing assembly supports a camshaft in the cam braking system. The bushing boot is preferably generally cylindrical having a first end, a second end and an internal bore extending along a longitudinal axis. In a preferred embodiment, the boot also has an internal circumferential groove within the bore at its first end and an external circumferential groove at its second end. The bushing assembly includes a washer at an end adjacent the boot. The internal groove of the boot snaps in place over the outside diameter of the bushing assembly washer, thereby providing an axial locating feature. The internal bore of the boot receives the camshaft. Further, the external groove on the boot receives a tie strap to connect the boot to the camshaft. In the preferred embodiment, the boot rotates with the camshaft. In an alternative embodiment, the boot does not have an external circumferential groove. Also in the alternative embodiment, the boot snaps onto the bushing assembly and does not rotate with the camshaft.

19 Claims, 2 Drawing Sheets

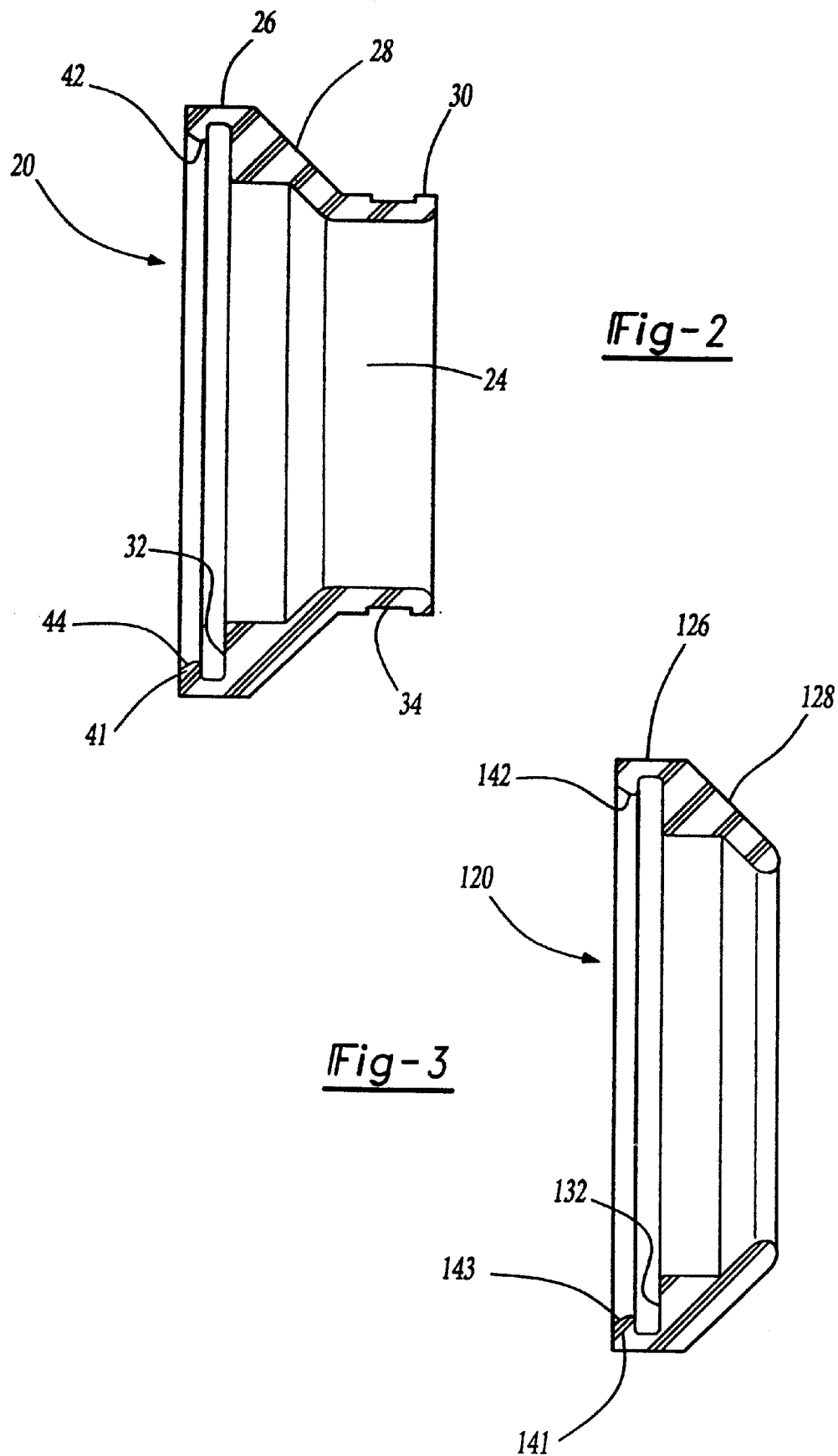

BUSHING BOOT FOR A CAM BRAKING SYSTEM

BACKGROUND OF THE INVENTION

This invention generally relates to a boot for a cam braking system bushing assembly and more particularly to a boot that snaps in place.

Bushing assemblies are used to support a camshaft in a brake housing. As known, the brake camshaft drives a brake cam to actuate the brake. A secondary purpose of the bushing assembly is to allow for lubrication of the camshaft so that it can freely rotate.

Known cam bushing assemblies include a bushing retainer having an aperture and a bushing disposed within the aperture. The bushing retainer is removably attached to the brake housing and the bushing is removably attached to the retainer. This design allows for more efficient lubrication flow around the camshaft.

Boot assemblies have been used in combination with spherical bushing retainers. The purpose of the boot is to keep dirt and other contaminants away from the bushing environment. However, the design of the boot used with spherical bushing retainers are not very effective at preventing contaminants from entering the bushing assembly environment because the boot is not secured to the bushing assembly. Further, the boot does not act as a secondary sealing system. Lubrication could leak around the boot because the boot is not connected to the retainer.

An ineffective boot design allows dirt and debris within the bushing environment. The introduction of debris into the bushing environment contributes to increased wear of the bushing components and the camshaft. Increased wear of the components translates into frequent maintenance, high repair costs, and decreased life expectancy of all cam braking system components.

SUMMARY OF THE INVENTION

The cam bushing boot assembly of the present invention overcomes the above problems with known cam bushing boot assemblies. In general terms, the disclosed boot assembly covers and protects a bushing assembly in a cam braking system by snapping in place over the bushing retainer. The boot assembly directly connects to the bushing assembly by preferably snapping over the bushing assembly. Further, the boot assembly can be used with any type of cam brake bushing assembly, including, but not limited to, cam bushing assemblies and spherical ball design bushing assemblies.

The primary purpose of the boot assembly is to provide a shield to minimize intrusion of debris and other contaminants around the camshaft support bushing and its associated seals. Dirt and contaminants cause damage to the bushing, its seals and ultimately the camshaft, thereby increasing the amount of required maintenance of those parts and the frequency of replacement. Therefore, it is desirable to minimize the amount of contaminants introduced to the bushing environment. The boot serves this purpose. Use of the boot decreases the wear of the bushing and the seals, therefore, increasing the useful life of bushing components and the camshaft.

Additionally, the boot assembly acts as a secondary sealing system that supplements the primary sealing system. In other words, the boot helps contain the lubrication within the bushing assembly.

These and other features of the invention may be best understood from the following specification and drawings. The following is a brief description of the drawings.

BRIEF DESCRIPTION OF THE DRAWINGS

FIG. 2 is a cross sectional view of a bushing boot for a cam braking system.

FIG. 3 is a cross sectional view of an alternative embodiment.

DETAILED DESCRIPTION OF THE PREFERRED EMBODIMENT

Figure 1:
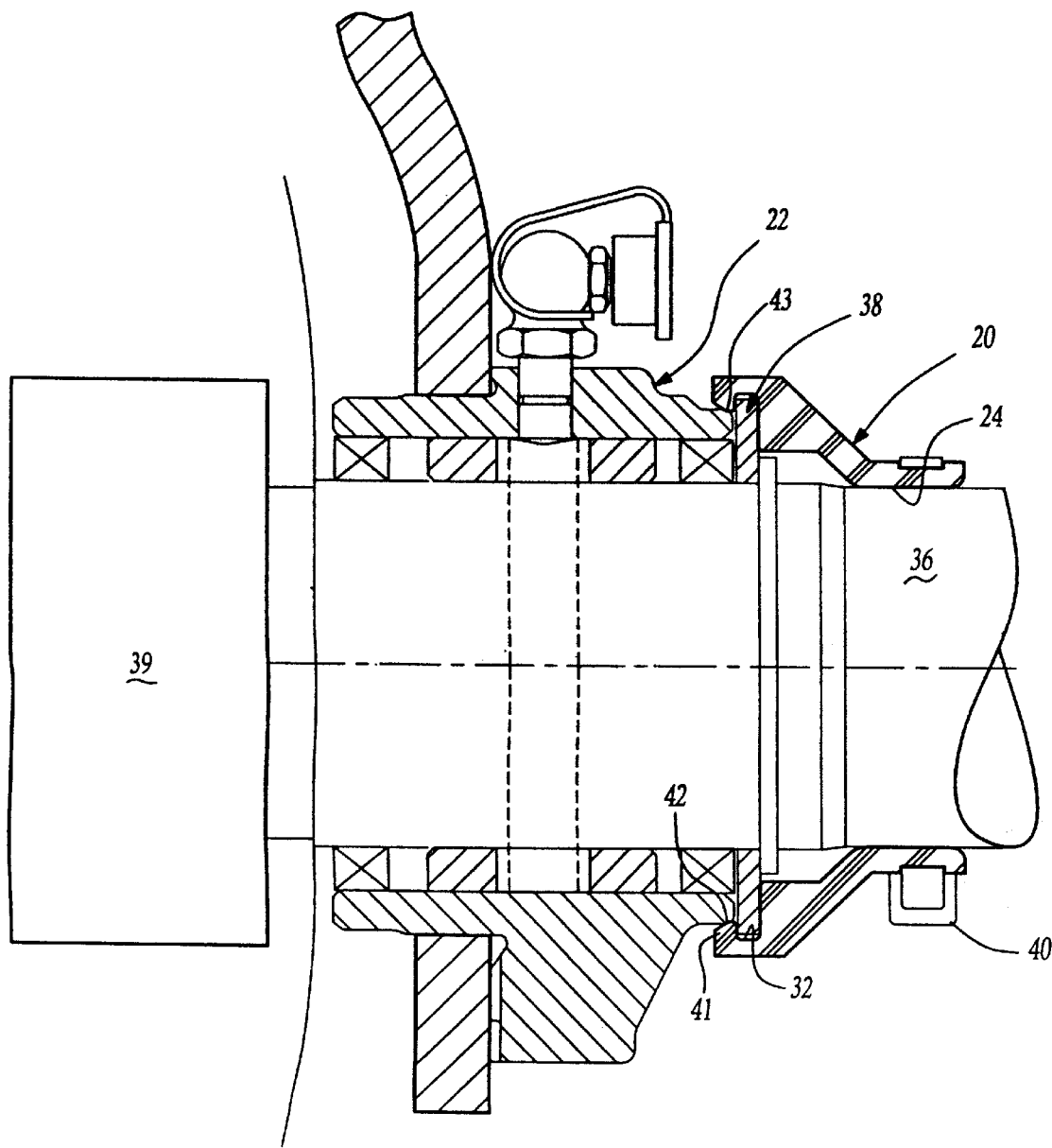
FIG. 1 is a cross sectional view of a system designed according to this invention.

FIG. 1 illustrates a bushing boot for a cam braking system, shown at 20. Preferably, the bushing boot 20 is made of neoprene elastomeric compound. The boot 20 preferably covers and protects a bushing assembly 22 in a cam braking system by directly connecting to the bushing assembly 22. Further, the boot 20 is, preferably, generally cylindrical and has an interior bore 24.

The boot 20 covers a cam bushing assembly 22. Bushing assembly 22 supports a camshaft 36 and includes a washer 38. As known, a brake cam 39, shown schematically, is mounted on an opposed side of bushing assembly 22 from boot 20.

Boot 20 is designed to conform to the shapes of the camshaft 36 and bushing assembly 22. The interior bore 24 of the boot 20 receives the camshaft 36. Further, the internal groove 32 in the boot 20 fits, or preferably snaps, over the outside diameter of the bushing assembly washer 38, thereby providing an axial locating feature. That is, a forward end 41 of boot 20 snaps radially outwardly to move beyond washer 38. A surface 42 on boot 20 is deformed against a surface 43 on bushing assembly 22.

An external groove 34 in the boot 20 preferably receives a tie strap 40 that connects the boot 20 to the camshaft 36. Alternatively, other types of clamps could be used to connect the boot 20 to the camshaft 36. Once connected to the camshaft 36, the boot 20 rotates with the camshaft 36.

As shown in FIG. 2, the boot 20 could be said to have three contiguous sections. The first section 26 is generally cylindrical and includes groove 32 and forward end 41. The second section 28 is generally conical. Finally, the third section 30 is generally cylindrical and has an inner diameter, smaller than the inner diameter of section 26. Therefore, the wider end of the conical section 28 is adjacent the first section 26 and the narrower end of the conical section 28 is adjacent the third section 30. The bushing boot 20 also has the external circumferential groove 34 in the third section 30.

As can be seen, the forward end 42 has a radially outwardly extending surface 43 leading to the end of the forward end 41. The surface 44 extends from the outward end radially inwardly to the sealing surface 42. This surface facilitates the snapping of the forward end 41 and in particular surface 42 over the washer. As can be seen by comparing FIGS. 1 and 2, the sealing surface 42 is deformed when the boot 20 is received on the bushing assembly by contact with the surface 43 such that a good seal is provided.

An alternative embodiment is shown in FIG. 3. This embodiment is also generally cylindrical and has an internal bore. The boot 120 is preferably comprised of two contiguous sections. The first section 126 is generally cylindrical. The second section 128 is generally conical. The wider end of the conical section 128 is adjacent the first section 126. The bushing boot 120 has an internal circumferential groove 132 within the bore in the first section 126 and forward and sealing section 141, 142, 143 similar to the FIG. 2 embodiment. However, the boot 120 does not have a second, external groove. Rather, the boot 120 snaps directly onto the bushing assembly 22 and does not rotate with the camshaft 36.

The invention has been described in an illustrative manner, and it is to be understood that the terminology that has been used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. A cam braking system comprising:
   a camshaft defining a longitudinal axis;
   a boot having an interior bore surrounding said longitudinal axis and an internal circumferential groove at a first end of said boot and a second end closely surrounding said camshaft;
   a bushing assembly supporting said camshaft, said bushing assembly having a radially enlarged portion that includes a disk-shaped portion, and said internal groove of said boot snapping over said bushing assembly disk-shaped portion; and
   wherein said boot has a first section that is generally cylindrical and a second section that is generally conical and wherein a wider end of said conical section is adjacent said first section.

2. The assembly of claim 1, wherein said disk-shaped portion comprises a washer.

3. The assembly of claim 2, wherein said internal groove of said boot snaps over the washer.

4. The assembly of claim 1, wherein said boot is secured to said camshaft at said second end, such that said boot rotates with said camshaft.

5. The assembly of claim 4, wherein said boot further comprises an external circumferential groove at a second end.

6. The assembly of claim 5, wherein said external groove receives a tie strap to connect said boot to the camshaft.

7. The assembly of claim 4, wherein said boot has a first section that is generally cylindrical having a first diameter, a second section that is generally conical, a third section that is generally cylindrical having a second diameter that is narrower than said first diameter, and wherein said three sections are contiguous.

8. The assembly of claim 1, wherein said boot is made of neoprene elastomeric compound.

9. The assembly of claim 1, wherein said boot is secured to said bushing assembly, and does not rotate with said camshaft.

10. The assembly of claim 1, wherein a forward end of said boot spaced toward said bushing assembly, and defining said first end, snaps over said enlarged portion, and sealingly abuts the radially outer surface of said bushing assembly.

11. The assembly of claim 10, wherein said forward end includes an entrance surface extending radially inwardly to a sealing surface, said entrance in said sealing surfaces facilitating the snapping of said boot over said radially enlarged portion.

12. A boot and bushing assembly for a cam braking system comprising:
    a bushing assembly for supporting and lubricating a camshaft including a disk-shaped portion; and
    a boot that surrounds the camshaft and is generally cylindrical having a first end, a second end, and an internal bore along a longitudinal axis for receipt of the camshaft, wherein said boot has an internal circumferential groove within said bore at said first end wherein said internal groove fits over said disk shaped portion.

13. The assembly of claim 12, wherein said disk-shaped portion comprises a washer.

14. The boot assembly of claim 12, wherein said boot rotates with the camshaft.

15. The boot of claim 12, wherein said boot is secured to said bushing assembly, and does not rotate with said camshaft.

16. The boot assembly of claim 12, wherein said bushing assembly has a radially enlarged portion and wherein a forward end of said boot spaced toward said bushing assembly, and defining said first end, snaps over said radially enlarged portion, and sealingly abuts the radially outer surface of said bushing assembly.

17. The boot assembly of claim 16, wherein said forward end includes an entrance surface extending radially inwardly to a sealing surface, said entrance in said sealing surfaces facilitating the snapping of said boot over said radially enlarged portion.

18. A cam braking system comprising:
    a camshaft defining a longitudinal axis;
    a boot having an interior bore surrounding said longitudinal axis and an internal circumferential groove at a first end of said boot;
    an external circumferential groove at a second end; and
    a bushing assembly supporting said camshaft, said bushing assembly having a radially enlarged portion that includes a disk-shaped portion, and said internal groove of said boot snapping over said bushing assembly disk-shaped portion.

19. The assembly of claim 18, wherein said external groove receives a tie strap to connect said boot to the camshaft.

* * * * *